(12) United States Patent
Pope et al.

(10) Patent No.: US 7,934,141 B2
(45) Date of Patent: Apr. 26, 2011

(54) DATA PROTOCOL

(75) Inventors: Steve L. Pope, Cambridge (GB); Derek Roberts, Cambridge (GB); David Riddoch, Cambridge (GB); David Clarke, Harston (GB)

(73) Assignee: Solarflare Communications, Inc., Irvine, CA (US)

( * ) Notice: Subject to any disclaimer, the term of this patent is extended or adjusted under 35 U.S.C. 154(b) by 1134 days.

(21) Appl. No.: 10/548,126

(22) PCT Filed: Mar. 3, 2004

(86) PCT No.: PCT/GB2004/000900
§ 371 (c)(1),
(2), (4) Date: Oct. 17, 2006

(87) PCT Pub. No.: WO2004/079981
PCT Pub. Date: Sep. 16, 2004

(65) Prior Publication Data
US 2007/0162609 A1    Jul. 12, 2007

(30) Foreign Application Priority Data
Mar. 3, 2003 (GB) .................................. 0304807.1

(51) Int. Cl.
*H03M 13/00* (2006.01)
(52) U.S. Cl. ....................................... 714/758; 702/189
(58) Field of Classification Search .................. 714/758; 702/189
See application file for complete search history.

(56) References Cited

U.S. PATENT DOCUMENTS

| | | | |
|---|---|---|---|
| 4,512,011 A | | 4/1985 | Turner |
| 6,041,434 A | * | 3/2000 | Kamishima .................. 714/807 |
| 6,339,481 B1 | * | 1/2002 | Scott .............................. 358/442 |
| 2005/0117577 A1 | * | 6/2005 | Fichou et al. ................. 370/389 |

FOREIGN PATENT DOCUMENTS
WO    WO 02/25931 A1    3/2002

OTHER PUBLICATIONS

Riddoch, David et al.; "Distributed Computing With the CLAM Network"; Laboratory for Communications Engineering, Cambridge, England; SIGCOMM 2002, 13 pages.

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.

(Continued)

*Primary Examiner* — Guy J Lamarre
(74) *Attorney, Agent, or Firm* — Warren S. Wolfeld; Haynes Beffel & Wolfeld LLP

(57) ABSTRACT

A method of transmitting data according to a data transmission protocol wherein the data is transmitted as a plurality of data frames and each data frame includes an error checking field comprising at least two sub-fields, the data of the first sub-field being formed by a first error checking method performed on data of the frame and the data of the second sub-field being formed by a second error checking method performed on the said data of the frame, the first and second methods being such that the data of the first sub-field has different error checking properties from those of the data of the second sub-field.

17 Claims, 10 Drawing Sheets

Minimum - Length CI Cluster - Mode Burst

OTHER PUBLICATIONS

Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.

Tolmie, D. et al.; "From HiPPI-800 to HiPPI-6400: A Changing of the Guard and Gateway to the Future"; IEEE The 8th International Conference on Parallel Interconnects, 1999, 194-201.

Gordon E. Moore; Electronics, vol. 38, No. 8, pp. 114-117, 1965, Apr. 19, 1965.

Jack B. Dennis and Earl C. Van Horn; Communications of the ACM, vol. 9, No. 3, pp. 143-155, Mar. 1966.

Marvin Zelkowitz; Communications of the ACM, vol. 14, No. 6, p. 417-418, Jun. 1971.

J. Carver Hill; Communications of the ACM, vol. 16, No. 6, p. 350-351, Jun. 1973.

F.F. Kuo; ACM Computer Communication Review, vol. 4 No. 1, Jan. 1974.

Vinton Cerf, Robert Kahn; IEEE Transactions on Communications, vol. COM-22, No. 5, pp. 637-648, May 1974.

V. Cerf, et al.; ACM Computer Communication Review, vol. 6 No. 1, p. 1-18, Jan. 1976.

Robert M. Metcalfe and David R. Boggs; Communications of the ACM, vol. 19, Issue 7, pp. 395-404, Jul. 1976.

P. Kermani and L. Kleinrock; Computer Networks, vol. 3, No. 4, pp. 267-286, Sep. 1979.

John M. McQuillan, et al.; Proceedings of the 6th Data Communications Symposium, p. 63, Nov. 1979.

Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.

John Nagle; ACM Computer Communication Review, vol. 14, No. 4, p. 11-17, Oct. 1984.

Robert M. Brandriff, et al.; ACM Computer Communication Review, vol. 15, No. 4, Sep. 1985.

C. Kline; ACM Computer Communication Review, vol. 17, No. 5, Aug. 1987.

Christopher A. Kent, Jeffrey C. Mogul; ACM Computer Communication Review, vol. 17, No. 5, pp. 390-401, Oct. 1987.

Gary S. Delp, et al.; ACM Computer Communication Review, vol. 18, No. 4, p. 165-174, Aug. 1988.

David R. Boggs, et al.; ACM Computer Communication Review, vol. 18, No. 4, p. 222-234, Aug. 1988.

H. Kanakia and D. Cheriton; ACM Computer Communication Review, vol. 18, No. 4, p. 175-187, Aug. 1988.

V. Jacobson; ACM Computer Communication Review, vol. 18, No. 4, p. 314-329, Aug. 1988.

David D. Clark; ACM Computer Communication Review, vol. 18, No. 4, pp. 106-114, Aug. 1988.

Paul V. Mockapetris, Kevin J. Dunlap; ACM Computer Communication Review, vol. 18, No. 4, pp. 123-133, Aug. 1988.

Margaret L. Simmons and Harvey J. Wasserman; Proceedings of the 1988 ACM/IEEE conference on Supercomputing, p. 288-295, Orlando, Florida, Nov. 12, 1988.

David A. Borman; ACM Computer Communication Review, vol. 19, No. 2, p. 11-15, Apr. 1989.

R. Braden, et al.; ACM Computer Communication Review, vol. 19, No. 2, p. 86-94, Apr. 1989.

David D. Clark, et al.; IEEE Communications Magazine, vol. 27, No. 6, pp. 23-29, Jun. 1989.

David R. Cheriton; ACM Computer Communication Review, vol. 19, No. 4, p. 158-169, Sep. 1989.

Derek Robert McAuley; PhD Thesis, University of Cambridge, Sep. 1989.

Craig Partridge; ACM Computer Communication Review, vol. 20, No. 1, p. 44-53, Jan. 1990.

D. D. Clark and D. L. Tennenhouse; ACM Computer Communication Review, vol. 20, No. 4, pp. 200-208, 1990, Sep. 1990.

Eric C. Cooper, et al.; ACM Computer Communication Review, vol. 20, No. 4, p. 135-144, Sep. 1990.

Bruce S. Davie; ACM Computer Communication Review, vol. 21, No. 4, Sep. 1991.

C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

Jonathan M. Smith and C. Brendan S. Traw; IEEE Network, vol. 7, Issue 4, pp. 44-52, Jul. 1993.

Jeffrey R. Michel; MSci Thesis, University of Virginia, Aug. 1993.

Mark David Hayter; PhD Thesis, University of Cambridge, Sep. 1993.

Jonathan Kay and Joseph Pasquale; ACM Computer Communication Review, vol. 23, No. 4, pp. 259-268, Oct. 1993.

W. E. Leland, et al.; ACM Computer Communication Review, vol. 23, No. 4, p. 85-95, Oct. 1993.

C. A. Thekkath, et al.; ACM Computer Communication Review, vol. 23, No. 4, Oct. 1993.

Raj K. Singh, et al.; Proceedings of the 1993 ACM/IEEE conference on Supercomputing, p. 452-461, Portland, Oregon, Nov. 15, 1993.

Peter Druschel and Larry L. Peterson; ACM Operating Systems Review, vol. 27, Issue 5, p. 189-202, Dec. 1993.

Matthias Kaiserswerth; IEEE/ACM Transactions on Networking, vol. 1, No. 6, p. 650-663, Dec. 1993.

Chris Maeda, Brian Bershad; ACM Operating Systems Review, vol. 27, Issue 5, p. 244-255, Dec. 1993.

Greg Regnier, et al.; IEEE Micro, vol. 24, No. 1, p. 24-31, Jan. 1994.

J. Vis; ACM Computer Communication Review, vol. 24, No. 1, pp. 7-11, Jan. 1994.

Danny Cohen, Gregory Finn, Robert Felderman, Annette DeSchon; Journal of High Speed Networks, Jan. 3, 1994.

Gregory G. Finn and Paul Mockapetris; Proceedings of InterOp '94, Las Vegas, Nevada, May 1994.

Stuart Wray, et al.; Proceedings of the International Conference on Multimedia Computing and Systems, p. 265-273, Boston, May 1994.

Various forum members; Message-Passing Interface Forum, University of Tennessee, Knoxville, May 5, 1994.

Raj K. Singh, et al.; ACM Computer Communication Review, vol. 24, No. 3, p. 8-17, Jul. 1994.

P. Druschel, et al.; ACM Computer Communication Review, vol. 24, No. 4, Oct. 1994.

Sally Floyd; ACM Computer Communication Review, vol. 24, No. 5, p. 8-23, Oct. 1994.

A. Edwards, et al.; ACM Computer Communication Review, vol. 24, No. 4, pp. 14-23, Oct. 1994.

L. S. Brakmo, et al.; ACM Computer Communication Review, vol. 24, No. 4, p. 24-35, Oct. 1994.

A. Romanow and S. Floyd; ACM Computer Communication Review, vol. 24, No. 4, p. 79-88, Oct. 1994.

R. J. Black, I. Leslie, and D. McAuley; ACM Computer Communication Review, vol. 24, No. 4, p. 158-167, Oct. 1994.

Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997. 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10. 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.

David Wetherall; ACM Computer Communication Review, vol. 36, No. 3, pp. 77-78, Jul. 2006.

Patrick Geoffray; HPCWire article: http://www.hpcwire.com/features/17886984.html, Aug. 18, 2006.

Geoffray P., "Protocol off-loading vs on-loading in high-performance networks," 14th Symposium on High Performance Interconnects, Aug. 23, 2006, 5pp.

Jose Carlos Sancho, et al.; Proceedings of the 2006 ACM/IEEE conference on Supercomputing, Tampa, Florida, Nov. 11, 2006.

Sayantan Sur, et al.; Proceedings of the 2006 ACM/IEEE conference on Supercomputing, Tampa, Florida, Nov. 11, 2006.

Steven Pope, David Riddoch; ACM Computer Communication Review, vol. 37, No. 2, pp. 89-92, Mar. 19, 2007.

Kieran Mansley, et al.; Euro-Par Conference 2007, pp. 224-233, Rennes, France, Aug. 28, 2007.

M. Kaiserswerth; IEEE/ACM Transactions in Networking vol. 1, Issue 6, pp. 650-663, Dec. 1993.

Danny Cohen, et al.; ACM Computer Communication Review, vol. 23, No. 4, p. 32-44, Jul. 1993.

J. Evans and T. Buller; IEEE TCGN Gigabit Networking Workshop, Apr. 22, 2001.

M.V. Wilkes and R.M. Needham; ACM SIGOPS Operating Systems Review, vol. 14, Issue 1, pp. 21-29, Jan. 1980.

Dickman, L., "Protocol OffLoading vs OnLoading in High Performance Networks," 14th Symposium on High Performance Interconnects, Aug. 23, 2006, 8pp.

Mogul J., "TCP offload is a dumb idea whose time has come," USENIX Assoc., Proceedings of HotOS IX: The 9th Workshop on Hot Topics in Operating Systems, May 2003, pp. 24-30.

Petrini F., "Protocol Off-loading vs On-loading in High-Performance Networks," 14th Symposium on High Performance Interconnects, Aug. 23, 2006, 4pp.

Regnier G., "Protocol Onload vs. Offload," 14th Symposium on High Performance Interconnects, Aug. 23, 2006, 1 pp.

Montry G., OpenFabrics Alliance presentation slides, 14th Symposium on High Performance Interconnects, Aug. 23, 2006, 8pp.

Blumrich, M. A. et al., "Virtual Memory Mapped Network Interface for the SHRIMP Multicomputer", Proceedings of the Annual International Symposium on Computer Architecture, Chicago, Apr. 18-21, 1994, Los Alamitos, IEEE Comp. Soc. Press, US, vol. SYMP. 21, Apr. 18, 1994 pp. 142-153, XP000480431 ISBN: 0-8186-5510-0 3.1 Physical Memory Mapping fig. 2.

\* cited by examiner

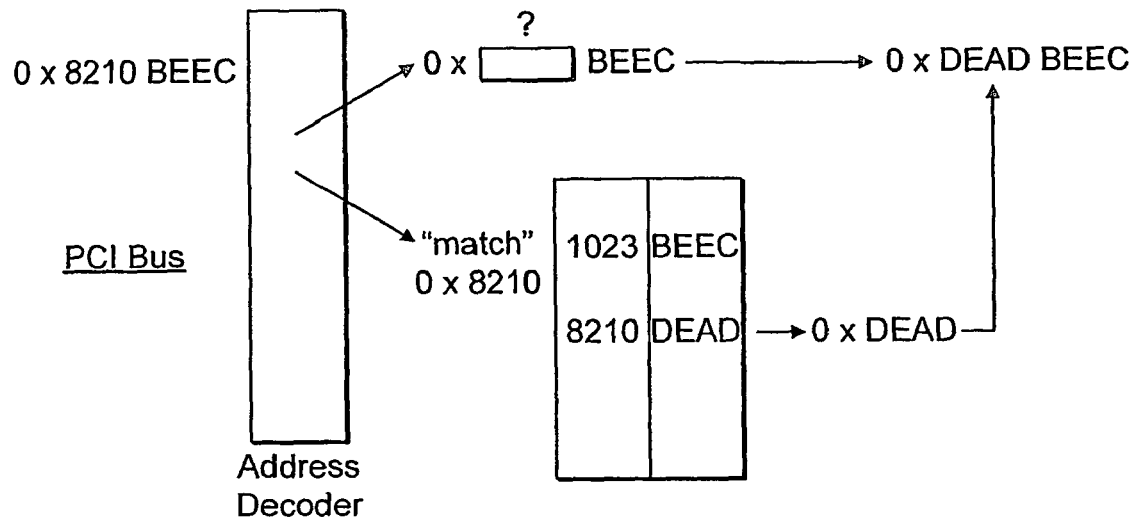
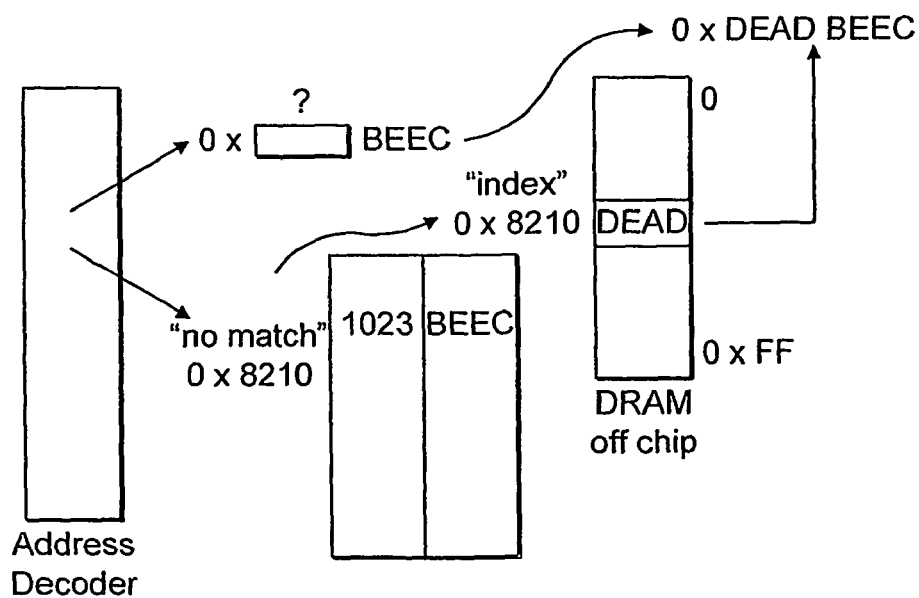
FIG. 5

(NB Order Here Not Relevant)

| Base of PCI Address | 48 Byte Dest Ethernet Address | 16 Byte Dest Cluster Address | Type CI | Type CI Event / Nonce | Aperture Index | Seq Number / Seq Number |
|---|---|---|---|---|---|---|
| " | " | 4 Byte Dest IP Address | Type IP | Port | | " |
| | | | | Nonce | | |

PCI →→→ Ethernet Packet

Outgoing Apertures

FIG. 10

Incoming Apertures

| Aperture Index | Nonce | Seq Number | Type CI | Source Cluster Address | Source Ethernet Address | Size | Base of PCI Address for Aperture |
|---|---|---|---|---|---|---|---|
| Port | | Seq Number | Type CI Event | Source IP Address | Source Ethernet Address | | Pointer to Descripter for Event Queue |
| " | " | | Type IP | " | " | | Pointer to Descripter Variable Data Queue |

Ethernet Packet →→→ PCI

FIG. 11

Typical CI Cluster Mode Burst

DATA PROTOCOL

This is a national stage entry under 35 U.S.C. 371 of PCT/GB2004/000900 filed 3 Mar. 2004, which is based on Great Britain Patent Application No. GB0304807:1 filed 3 Mar. 2003.

This invention relates to a data protocol suitable for use in passing data over a network, and apparatus suitable for use with such a protocol.

When data is to be transferred between two devices over a data channel, each of the devices must have a suitable network interface to allow it to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware component of network interfaces are referred to as network interface cards (NICs), although they need not be in the form of cards: for instance they could be in the form of integrated circuits (ICs) and connectors fitted directly on to a motherboard.

Where data is to be transferred between cooperating processors in a network, it is common to implement a memory mapped system. In a memory mapped system communication between the applications is achieved by virtue of a portion of one application's virtual address space being mapped over the network onto another application. The "holes" in the address space which form the mapping are termed apertures.

FIG. 1 illustrates a mapping of the virtual address space $(X_o\text{-}X_n)$ onto another virtual address space $(Y_o\text{-}Y_n)$ via a network. In such a system a CPU that has access to the $X_o\text{-}X_n$ memory space could access a location $x_1$ for writing the contents of a register $r_1$ to that location by issuing the store instruction [st $r_1$, $x_1$]. A memory mapping unit (MMU) is employed to map the virtual memory onto physical memory location.

The following steps would then be taken:
1. CPU emits the contents of $r_1$ (say value 10) as a write operation to virtual address $x_1$
2. The MMU (which could be within the CPU) turns the virtual address $x_1$ into physical address $pci_1$ (this may include page table traversal or a page fault)
3. The CPU's write buffer emits the "write 10, $pci_1$" instruction which is "caught" by the controller for the bus on which the CPU is located, in this example a PCI (Input/Output bus subsystem) controller. The instruction is then forwarded onto the computer's PCI bus.
4. A NIC connected to the bus and interfacing to the network "catches" the PCI instruction and forwards the data to the destination computer at which virtual address space $(Y_o\text{-}Y_n)$ is hosted.
5. At the destination computer, which is assumed to have equivalent hardware, the network card emits a PCI write transaction to store the data in memory
6. The receiving application has a virtual memory mapping onto the memory and may read the data by executing a "load $Y_1$" instruction These steps are illustrated by FIG. 2. This figure illustrates that at each point that the hardware store instructions passes from one hardware device to another, a translation of the address from one address space to another may be required. Also note that a very similar chain of events supports read operations and PCI is assumed but not required as the host IO bus implementation.

Hence the overall memory space mapping $\{X_o\text{-}X_n\} \rightarrow \{Y_o\text{-}Y_n\}$ is implemented by a series of sub-mappings as follows:

$\{X_o\text{-}X_n\}$
$\rightarrow$
$\{PCI_o, PCI_n\}$ (processor 1 address space)
$\rightarrow$
$\{PCI'_o, PCI'_n\}$ (PCI bus address space)
$\rightarrow$
Network—mapping not shown
$\rightarrow$
$\{PCI''_o\text{-}PCI''_n\}$ (destination PCI bus address space)
$\rightarrow$
$\{mem_o\text{-}mem_n\}$ (destination memory address space)
$\rightarrow$
$\{Y_o\text{-}Y_n\}$ (destination application's virtual address space)

The step marked in FIG. 2 as "Network" requires the NIC/network controller to forward the transaction to the correct destination host in such a way that the destination can continue the mapping chain. This is achieved by means of further memory apertures.

According to one aspect of the present invention there is provided a method of transmitting data according to a data transmission protocol wherein the data is transmitted as a plurality of data frames and each data frame includes an error checking field comprising at least two sub-fields, the data of the first sub-field being formed by a first error checking method performed on data of the frame and the data of the second sub-field being formed by a second error checking method performed on the said data of the frame, the first and second methods being such that the data of the first sub-field has different error checking properties from those of the data of the second sub-field.

Preferably the error checking field is a data word in the data frame. The error checking field preferably consists of data bits that are contiguous in the frame.

Preferably the first sub-field consists of bits that are contiguous in the frame. Preferably the second sub-field consists of bits that are contiguous in the frame.

Preferably the first sub-field and the second sub-field are of equal length, for example 16 bits. Alternatively the first sub-field and the second field may be of different lengths.

There may be one or more additional sub-fields formed in each error checking field, which are preferably formed using other error checking methods.

Preferably the first and second error checking methods are cyclic redundancy check methods and the generator polynomial for the first error checking method is different from the generator polynomial for the second error checking method.

One of the generator polynomials may be the X25 polynomial. The other of the generator polynomials may be the USB CRC-16 polynomial.

Preferably the first and second error checking methods are such that they result in the data of the first sub-field having different statistical properties from the data of the second sub-field as regards its indication of errors in the data.

Preferably the protocol is such that each data frame comprises one or more data sections, each data section comprising an address and traffic data to be applied to that address by a recipient of the data frame.

Preferably the protocol is such that each data frame comprises one or more error checking fields, the data of the first and second sub-fields of each error checking field subsequent to the first error checking field in a frame being formed respectively by the first and second error checking methods performed on the data on which the first and second error checking methods were performed to form the preceding error checking field in the frame together with data located between the preceding error checking field and the respective error checking field.

Preferably the data frame comprises a frame header. Preferably the frame header is excluded from the data on which the first and second error checking methods are performed to form the error checking fields. The frame header may indicate one or more of a source address of the data frame, a destination address of the data frame and a hop count for the data frame. The data frame may be an Ethernet frame. Preferably the protocol is such that the data frame comprises a frame checksum calculated over the frame. Preferably the frame header is included in the data on which the frame checksum is calculated.

The method preferably comprises: at a data transmitter forming a data frame according to the data transmission protocol; transmitting the data frame over a data network from the data transmitter to a data receiver; and at the data receiver verifying the received data on the basis of the data of the or each error checking field.

According to a second aspect of the present invention there is provided a method of transmitting data according to a data transmission protocol wherein the data is transmitted as a plurality of data frames and each data frame comprises one or more sections, each of which includes traffic data, a destination address for the traffic data of that section and error checking data for the traffic data of that section.

Preferably the error checking data of a data section is calculated over all the traffic data of that section. Preferably the error checking data of a data section is calculated over all the traffic data of that section and that of any preceding data section of the frame.

Preferably the data protocol is such that each data section may include two or more blocks of error checking data, each block of error checking data being calculated over the traffic data of that section that precedes the respective block of error checking data.

Preferably the error checking data includes data calculated according to a cyclic redundancy check algorithm, Preferably the data frame comprises a frame header and wherein the frame header is excluded from the data on error checking data is calculated.

Preferably the frame header indicates one or more of a source address of the data frame, a destination address of the data frame and a hop count for the data frame.

Preferably the data frame is an Ethernet frame.

Preferably the protocol is such that the data frame comprises a frame checksum calculated over the frame.

Preferably the frame header is included in the data on which the frame checksum is calculated.

Preferably the method comprises: at a data transmitter forming a data frame according to the data transmission protocol; transmitting the data frame over a data network from the data transmitter to a data receiver; and at the data receiver verifying the received data on the basis of the data of the or each error checking field.

Preferably the method comprises, where a data section includes two or more blocks of error checking data: if a block of error checking data is successfully verified applying the traffic data preceding that block to the destination address of that section, and if a block of error checking data is not successfully verified requesting retransmission of at least some of the data of the section from the transmitter.

The said at least some of the data may comprise all the traffic data between the block of error checking data that is not successfully verified and the preceding block of error checking data or the beginning of the data section if there was no preceding block of error checking data.

According to a third aspect of the present invention there is provided a method of receiving traffic data over a data link and writing the traffic data to a memory accessible to an application, the method comprising: maintaining first and second pointers to locations in the memory; analyzing data received over the data link to determine whether it represents traffic data or error checking data, and: if the received data represents traffic data writing the received data to the memory at the location indicated by the first pointer, and updating the first pointer to point to the next location in the memory; and if the received data represents error check data verifying the error check data, and if the error check data is successfully verified updating the second pointer to point to the same location as the first pointer.

Preferably the method comprises: at a transmitter forming data sections according to a protocol such that each data section comprises traffic data and one or more blocks of error checking data for the traffic data, and such that when a data section comprises two or more blocks of error checking data each block of error checking data is calculated over the traffic data preceding it in the data section; and transmitting the data sections over the data link to form the said data received over the data link.

Preferably the method comprises: if the error check data is not successfully verified and is the first error check data of a data section requesting retransmission of at least the traffic data preceding that error check data in the data section; and if the error check data is not successfully verified and is not the first error check data of a data section requesting retransmission of at least the traffic data preceding that error check data and subsequent to the preceding error check data in the data section.

Preferably the method comprises: if the error check data is not successfully verified reporting that to the transmitter of the data.

Preferably the method comprises: if the error check data is not successfully verified reporting that to the transmitter of the data and initiating renegotiation of parameters for data transmission over the link.

Preferably the traffic data is carried over the link in the form of data frames.

Preferably at least one network device on the route between the transmitter and the receiver of the data performs cut-through forwarding of the data frames.

Preferably the traffic data is associated with an address transmitted over the data link and indicating the initial location of the first pointer.

The error check data may be identified in any of a number of ways. One preferred option is for it to be preceded by data of a predetermined form, for example an escape word.

In the drawings:

FIGS. 4 and 5 illustrate mapping of bits of an address;

FIG. 10 shows an example of an outgoing aperture table;

FIG. 11 shows an example of an incoming aperture table;

Figure 1:
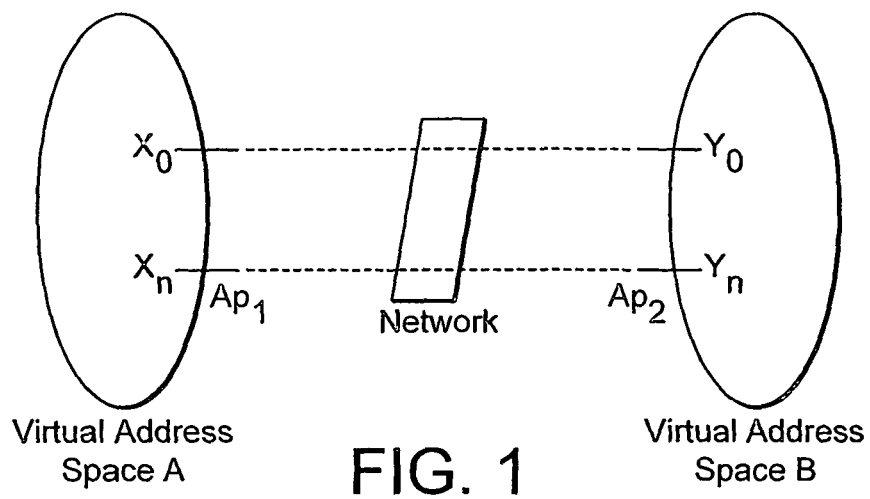
FIG. 1 illustrates mapping of one address space on to another over a network.
Figure 2:
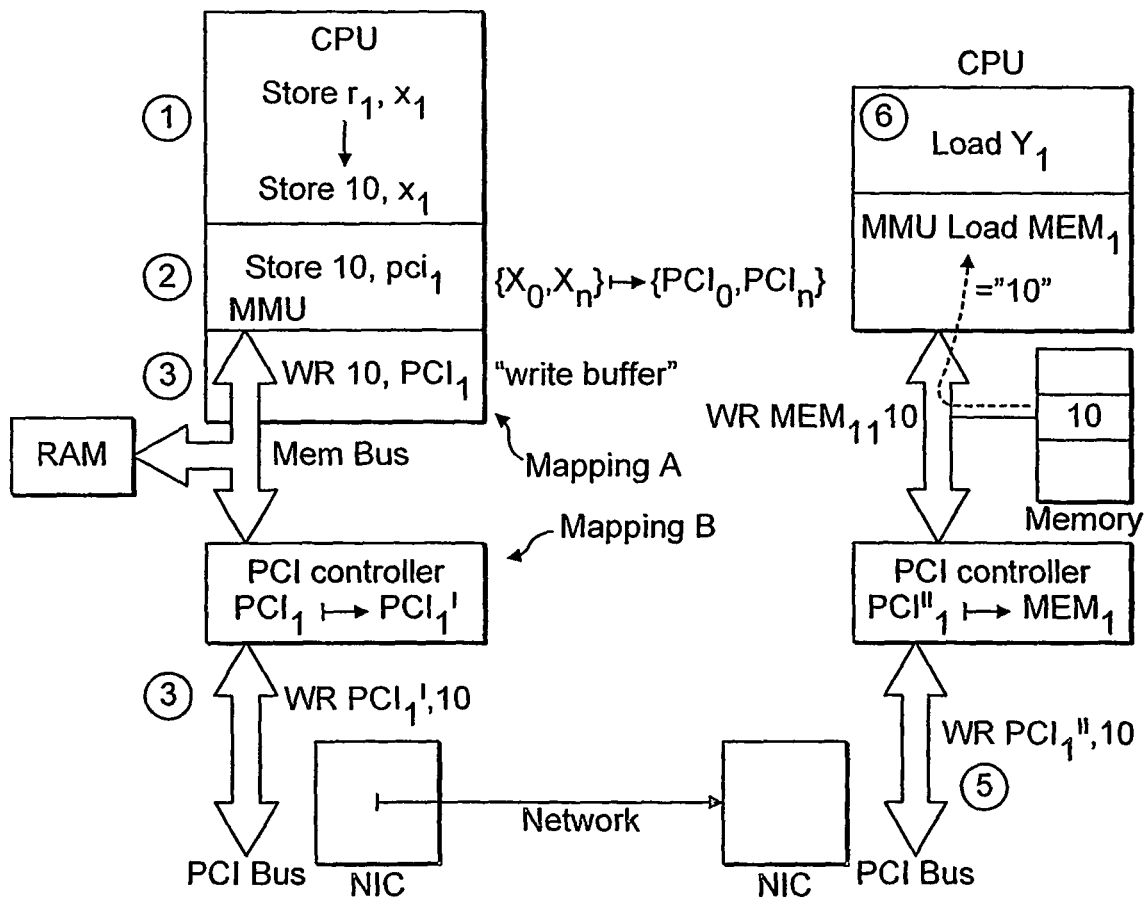
FIG. 2 illustrates the architecture of a prior art memory mapped architecture.
Figure 3:
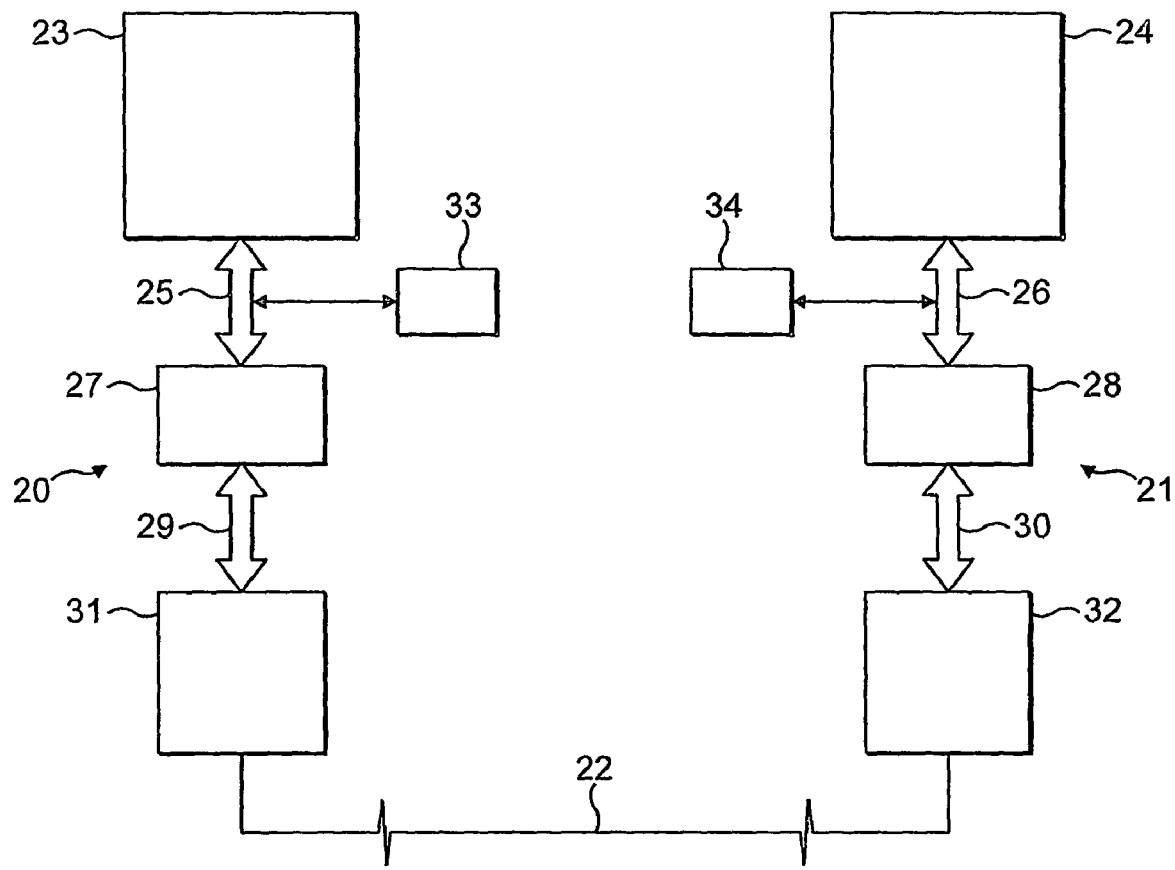
FIG. 3 is a schematic diagram of a data transmission system.

FIG. 3 is a schematic diagram of a data transmission system whereby a first data processing unit (DPU) 20 can communicate with a second data processing unit 21 over a network link 22. Each data processing unit comprises a CPU 23, 24 which is connected via a memory bus 25, 26 to a PCI controller 27, 28. The PCI controllers control communications over respective PCI buses 29, 30, to which are connected NICs 31, 32. The NICs are connected to each other over the network. Other similar data processing units can be connected to the network to allow them to communicate with each other and with the DPUs 20, 21. Local random access memory (RAM) 33, 34 is connected to each memory bus 25, 26.

The data transmission system described herein implements several significant features: (1) dynamic caching of aperture mappings between the NICs 31, 32; (2) a packet oriented setup and teardown arrangement for communication between the NICs; and (3) the use of certain bits that are herein termed "nonce bits" in the address space of one or both NICs.

Dynamic Caching of Aperture Entries

Figure 4:
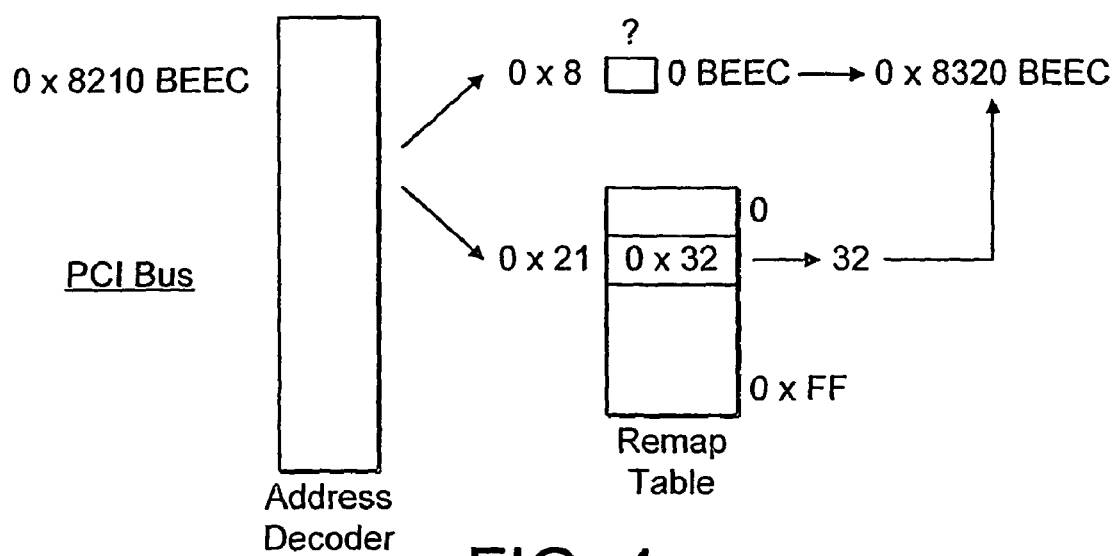

A small number of aperture mappings can be stored efficiently using a static table. To implement this, a number of bits (the map bits) of an address are caught by the address decode logic of an NIC and are used as an index into an array of memory which contains the bits that are used for reversing the mapping (the remap bits). For example, in a system of the type illustrated in FIG. 3 an NIC might receive over the PCI bus 29 a request for reading or writing data at a specified local address. The NIC stores a mapping that indicates the remote address that corresponds to that local address, the transformation being performed by substituting one or more of the bits of the local address. For example, the second and third nibbles of the address could be substituted. In that case to access the remote address that corresponds to a local address of 0x8210BEEC the NIC would access the mapping table, determine the mapping for bits "21" (suppose that is bits "32") and then address the corresponding remote address (in this example 0x8320BEEC). (See FIG. 4)

This method is scalable up to a few hundred or thousand entries depending on the implementation technology used (typically FPGA or ASIC) but is limited by the space available within the device that is used to hold the mapping table. A superior method of implementation is to store the mappings in a larger store (to which access is consequently slower) and to cache the most recently used mappings in an associative memory that can be accessed quickly. If a match for the bits that are to be substituted is found in the associative memory (by a hardware search operation) then the remap is made very quickly. If no match is found the hardware must perform a secondary lookup in the larger memory (in either a table or tree structure). Typically the associative memory will be implemented on the processing chip of the NIC, and the larger memory will be implemented off-chip, for example in DRAM. This is illustrated in FIG. 5. This method is somewhat similar to the operation of a TLB on a CPU; however here it is used for an entirely different function: i.e. for the purpose of aperture mapping on a memory mapped network card.

In practice, the mapping information must contain all the address information required to transmit a packet over a network. This is discussed in more detail below.

Packet Oriented Connection Setup and Tear Down Protocol

Figure 6:
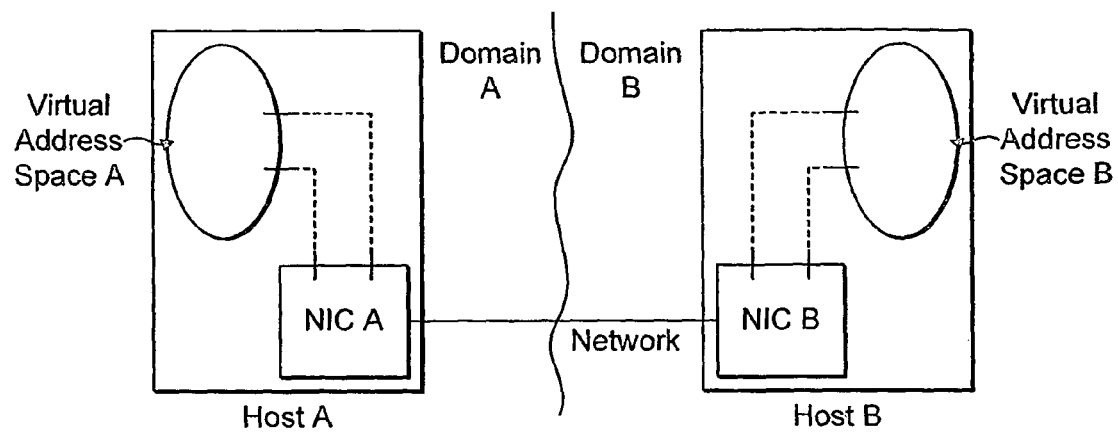
FIG. 6 illustrates memory space apertures and their management domains.

A protocol will now be described for establishing a connection between two applications' address spaces using apertures, where there are two administration domains (one belonging to each of the communicating hosts). The general arrangement is illustrated in FIG. 6. In domain A there is a host A having a virtual address space A and an NIC A that can access the virtual address space. In domain B there is a host B having a virtual address space B and an NIC B that can access the virtual address space. The NICs are connected together over a network.

In this example mapping entries for devices in domain A can only be set by the operating system on host A. A further implementation in which an application A running on host A is allowed to set some (but not all) bits on an aperture mapping within domain A is described below.

The connection protocol to be described uses IP (Internet Protocol) datagrams to transfer packets from one host to another (just as for standard Ethernet networks). The datagrams are addressed as <host:port> where <host> is the network identifier of the destination host and <port> is an identifier for the application (NB each application may have a number of allocated parts corresponding to different network connections) within the host. It will be appreciated that the present protocol could be used over other transport protocols than IP.

In the present protocol the connection setup proceeds as follows, assuming host A wishes to make an active connection to a passive (accepting) host B on which an application B is running.

1. Application B publishes its accepting internet address <$host_B$:$port_B$> this can be accessed over the network in the normal way.

2. Application A (which for convenience will be referred to as host A) presents a request to Operating System A for the creation of an incoming aperture onto memory within host A to be used for communication. Once this aperture has been defined its details are programmed on NIC A so that incoming network writes that are directed to addresses in that virtual space will be directed onto the corresponding real addresses in memory A. The aperture will be given a reference address: in-index A.

3. The host A sends an IP datagram to <$host_B$:$port_B$> which contains: the connect message:

[CONNECT/in-index$_A$]

Note that the full IP datagram will also contain source and destination IP addresses (and ports), as normal.

4. The connect message is received by application B. The message may be received either directly to user level or to the operating system (according to the status of the dual event queue) as described later.

5. Host B recognises the message as being a request to connect to B, offering the aperture in-index A. Using rules pre-programmed at B (typically for security reasons) host B will decide whether to reject or accept the connection. If B decides to accept the connection, it creates an (or uses a pre-created) incoming aperture which is mapped onto memory B and is given reference address: in-index$_B$. Host B may choose to create a new port for the connection: port'$_B$. Host B sends back to host A an accept message as an IP datagram:
[ACCEPT/:port'$_B$/in-index$_B$]
to host A. Note that the full IP datagram will also contain source and destination IP addresses (and ports), as normal.

Once this has been received, each host has created an aperture, each NIC is set up to perform the mapping for requests to read or write in that aperture, and each host knows the reference address of the other host's aperture.

6. Following the messaging discussed so far, both hosts create outgoing apertures. A creates an aperture which maps application A's virtual address space onto NIC$_A$ outgoing aperture OUT_index$_A$. This outgoing aperture maps onto [host$_B$:in-index$_B$] which maps onto memory B. Host B creates a similar outgoing aperture out-index$_B$ which maps onto memory A. By this means, bi-directional communication is possible through the memory mapped regions. At any time the applications may send a message to the port, which is associated with the memory mapping. These may be used to guarantee out of band data for example:
   (i) A CLOSE message to indicate that the connection and hence memory mappings should be closed down
   (ii) An ALIVE message to request a response from an non-responding application [ALIVEACK would be the response]
   (iii) An ERROR message which us generated by any hardware element on the data path which has detected a data transfer error. This message is important because it allows feedback to be provided from the memory mapped interface.

Note that where an application already has a virtual address mapping onto an outgoing aperture, step 6 reduces to a request for the NIC to map the outgoing aperture onto a particular host's incoming aperture. This is described further in terms of user level connection management below.

Dual Event Queues

Figure 7:
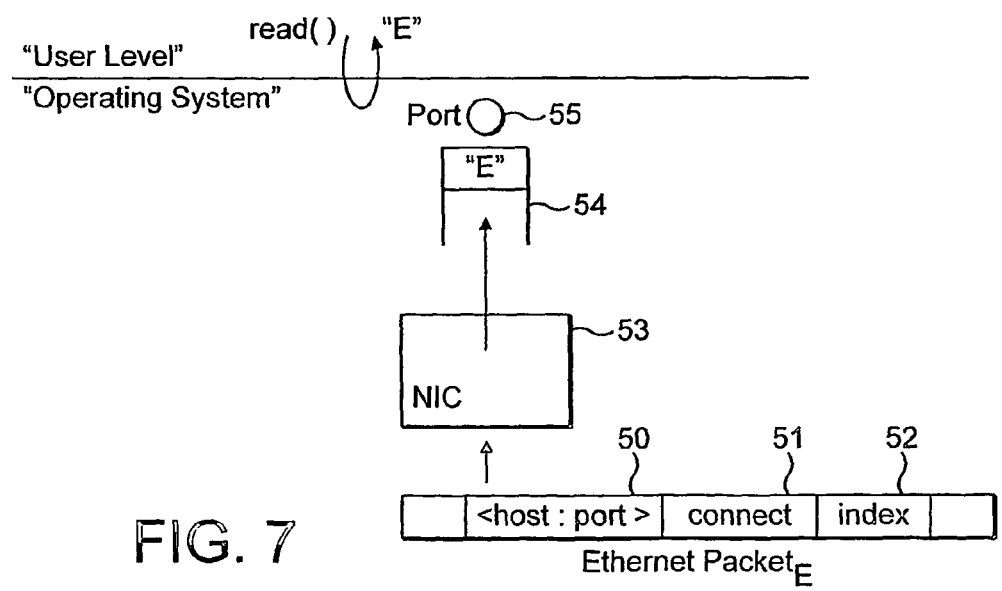
FIG. 7 illustrates features of a port.

In the present context a port will be considered to be an operating system specific entity which is bound to an application, has an address code, and can receive messages. This concept is illustrated in FIG. 7. One or more incoming messages that are addressed to a port form a message queue, which is handled by the operating system. The operating system has previously stored a binding between that port and an application running on the operating system. Messages in the message queue for a port are processed by the operating system and provided by the operating system to the application to which that port is bound. The operating system can store multiple bindings of ports to applications so that incoming messages, by specifying the appropriate port, can be applied to the appropriate application.

The port exists within the operating system so that messages can be received and securely handled no matter what the state of the corresponding application. It is bound (tethered) to a particular application and has a message queue attached. In traditional protocol stacks, e.g. in-kernel TCP/IP all data is normally enqueued on the port message queue before it is read by the application. (This overhead can be avoided by the memory mapped data transfer mechanism described herein).

In the scheme to be described herein, only out of band data is enqueued on the port message queue. FIG. 7 illustrates this for a CONNECT message. In FIG. 7, an incoming packet E, containing a specification of a destination host and port (field 50), a message type (field 51) and an index (field 52), is received by NIC 53. Since this data is a CONNECT message it falls into the class of out of band data. However, it is still applied to the message queue 54 of the appropriate port 55, from where it can be read by the application that has been assigned by the operating system to that port.

A further enhancement is to use a dual queue, associated with a port. This can help to minimise the requirements to make system calls when reading out of band messages. This is particularly useful where there are many messages e.g. high connection rate as for a web server, or a high error rate which may be expected for Ethernet.

At the beginning of its operations, the operating system creates a queue to handle out of band messages. This queue may be written to by the NIC and may have an interrupt associated with it. When an application binds to a port, the operating system creates the port and associates it with the application. It also creates a queue to handle out of band messages for that port only. That out of band message queue for the port is then memory mapped into the application's virtual address space such that it may de-queue events without requiring a kernel context switch.

The event queues are registered with the NIC, and there is a control block on the NIC associated with each queue (and mapped into either or both the OS or application's address space(s)).

Figure 8:
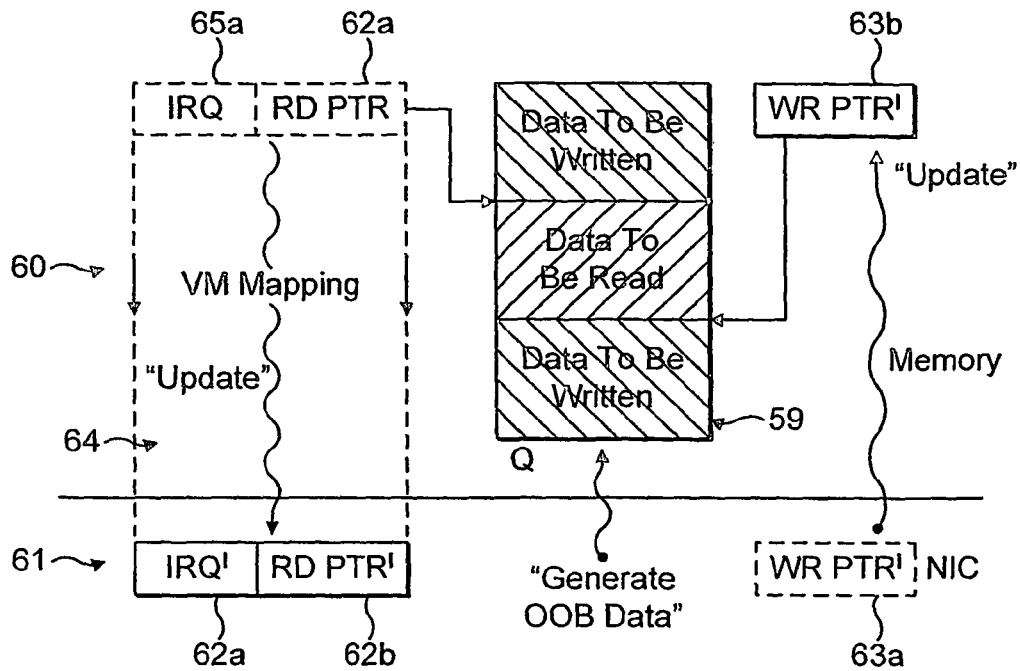
FIG. 8 illustrates a queue with control blocks.

A queue with control blocks is illustrated in FIG. 8. The queue 59 is stored in memory 60, to which the NIC 61 has access. Associated with the queue are a read pointer (RDPTR) 62a and a write pointer (WRPTR) 63a, which indicate the points in the queue at which data is to be read and written next. Pointer 62a is stored in memory 60. Pointer 63a is stored in NIC 61. Mapped copies of the pointers: RDPTR' 62b and WPTR' 63b are stored in the other of the NIC and the memory than the original pointers. In the operation of the system:

1. The NIC can determine the space available for writing by comparing RDPTR' and WRPTR, which it stores locally.
2. NIC generates out of band data when it is received in a datagram and writes it to the queue 59.
3. The NIC updates WRPTR and WRPTR' when the data has been written, so that the next data will be written after the last data.
4. The application determines the space available for reading by comparing RDPTR and WRPTR' as access from memory 60.
5. The application reads the out of band data from queue 59 and processes the messages.
6. The application updates RDPTR and RDPTR'.
7. If the application requires an interrupt, then it (or the operating system on its behalf) sets the IRQ 65a and IRQ' 65b bits of the control block 64. The control block is stored in memory 60 and is mapped onto corresponding storage in the NIC. If set, then the NIC would also generate an interrupt on step 3.

If an interrupt is generated, then firstly the PCI interrupt line is asserted to ensure the computer's interrupt handler is executed, but also a second message is delivered into the operating system's queue. In general, this queue can handle many interrupt types, such as hardware failure, but in this case, the OS queue contains the following message [ODB-DATA:PORT] indicating that out of band data has been delivered to the application queue belonging to [PORT]. The OS can examine the data in queue 59 and take appropriate action. The usual situation will be that the application is blocked or descheduled and the OS must wake it (mark as runnable to the scheduler).

Figure 9:
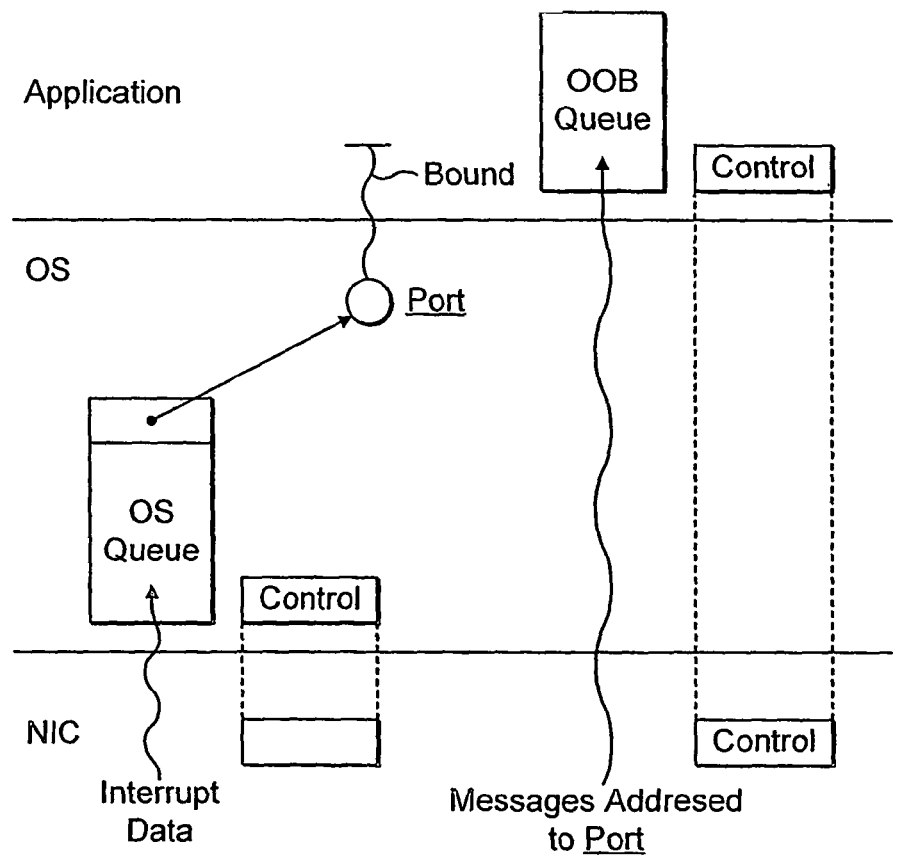
FIG. 9 illustrates a dual queue mechanism.

This dual queue mechanism enables out of band data to be handled by the application without involving the OS—while the application is running. Where the application(s) is blocked, the second queue and interrupt enable the OS to determine which of potentially many application queues have had data delivered. The overall arrangement is illustrated in FIG. 9.

The out of band (OOB) queue holds out of band data, which are:
1. Error events associated with the port
2. Connection setup messages and other signalling messages from the network and other applications
3. Data delivery events, which may be generated either by the sending application the NIC or the receiving OS.

If the queue is to contain variable sized data then the size of the data part of each message must be included at the start of the message.

When applications are to communicate in the present system over shared memory, a single work queue can be shared between two communicating endpoints using non-coherent shared memory. As data is written into the queue, write pointer (WRPTR) updates are also written by the transmitting application into the remote network-mapped memory to indicate the data valid for reading. As data is removed from the queue, read pointer (RDPR) updates are written by the receiving application back over the network to indicate free space in the queue.

These pointer updates are conservative and may lag the reading or writing of data by a short time, but means that a transmitter will not initiate a network transfer of data until buffer is available at the receiver, and the low latency of the pointer updates means that the amount of queue buffer space required to support a pair of communicating endpoints is small. The event mechanism described above can be used to allow applications to block on full/empty queues and to manage large numbers of queues via a multiplexed event stream, which is scalable in terms of CPU usage and response time.

Figure 13:
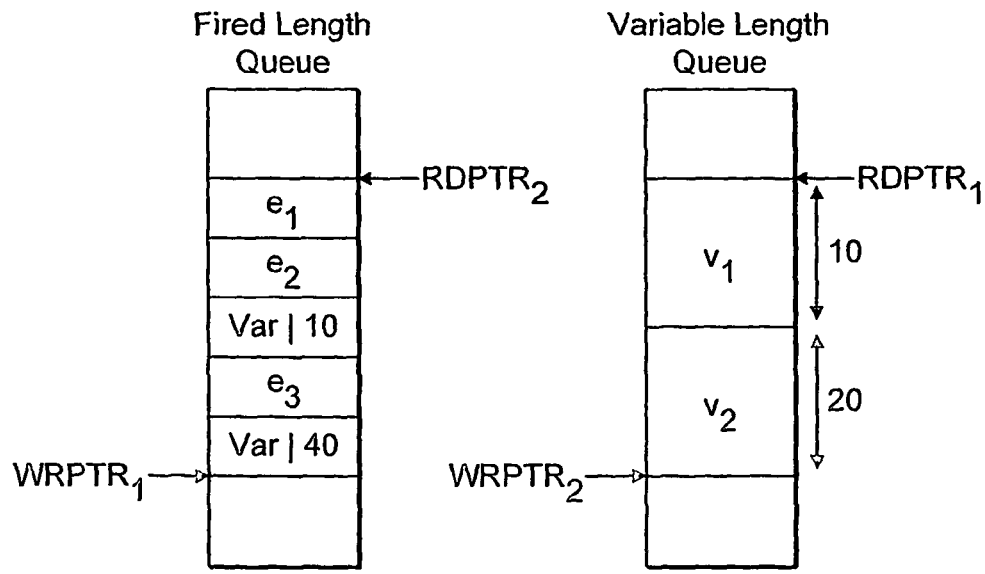
FIG. 13 illustrates the operation of pointers in fixed and variable length queues.

Variable length data destined for an event queue would be delivered to a second queue. This has the advantage of simplifying the event generation mechanism in hardware. Thus the fixed size queue contains simple events and pointers (size) into the variable length queue
1. As shown in FIG. 13, the difference between RDPTR, and WRPTR, indicates the valid events in the queue, and also the number of events because they are of fixed size.
2. The event Var 10 (for illustration) indicates that a variable sized event of size 10 words has been placed on the variable sized queue.
3. The difference between WRPTR$_2$ and RDPTR$_2$ indicates only the number of words which are in the variable sized queue, but the application is able to dequeue the first event in its entirety by removing 10 words.
4. The application indicates processing of an event to the NIC by updating the RDPTR on the NIC's memory
   (a) for the static queue by the number of events processed multiplied by the size of each event
   (b) for the variable sized queue by the number of words consumed (i.e. the same for both cases)
5. The data on the variable length queue may also contain the size (e.g. if it is a UDP/IP packet)

Enhanced Aperture Mappings and "Nonce Bits"

In this implementation, additional bits, termed "nonce bits" are provided in order to protect against malfunctioning or malicious hardware or software writing inadvertently to apertures. To illustrate this, the following network mapping will be discussed:
<virtual memory address>→<PCI address>→<host:in-index>→ . . .
<network packet>→<PCI address>→<physical memory address>→ . . .
<virtual memory address>

When performing the mapping to <host in-index> the NIC is able to create an outgoing packet which is addressed by <host: in-index>. This will be recognized by the NIC that receives the packet as being a packet intended for processing as an aperture packet, rather than as a packet intended to pass via a port to a corresponding application. Thus the packet is to be presented to the incoming aperture lookup hardware.

It should first be noted that under the scheme described above, the PCI address to which the data is sent encodes both the aperture mapping and an offset within the aperture. This is because the NIC can form the destination address as a function of the address to which the message on the PCI bus was formed. The address received by the NIC over the PCI bus can be considered to be formed of (say) 32 bits which include an aperture definition and a definition of an offset in that aperture. The offset bits are also encoded in the outgoing packet to enable the receiving NIC to write the data relative to the incoming aperture base. In the case of a data write the resulting network packet can be considered to comprise data together with a location definition comprising an offset, an in-index and an indication of the host to which it is addressed. At the receiving NIC at the host this will be considered as instructing writing of the data to the PCI address that corresponds to that aperture, offset by the received offset. In the case of a read request the analogous operation occurs. This feature enables an aperture to be utilized as a circular queue (as described previously) between the applications and avoids the requirement to create a new aperture for each new receive data buffer.

In this implementation the network packet also contains the nonce bits. These are programmed into the aperture mapping during connection setup and are intended to provide additional security, enabling apertures to be reused safely for many connections to different hosts.

The processing of the nonce bits for communications between hosts A and B is as follows:
1. At host A a random number is selected as nonce A.
2. Nonce A is stored in conjunction with an aperture in-index A
3. A connect message is sent to host B to set up communications in the way generally as described above. In this example the message also includes nonce A. Thus the connect message includes port B, in-index A, nonce A.
4. On receiving the connect message host B stores in-index A and nonce A in conjunction with outgoing aperture B.
5. Host B selects a random number as nonce B
6. Nonce B is stored in conjunction with an aperture in-index B
7. An accept message is sent to host B to accept the set up of communications in the way generally as described above. In this example the message also includes nonce B. Thus the accept message includes port B', in-index B, nonce B.
8. Host A stores in-index B and nonce B in conjunction with outgoing aperture A.

Once the connection is set up to include the nonce bits all packets sent from A to B via outgoing aperture A will contain nonce B. When received the NIC$_B$ will look up in-index B and compare the received nonce value with that programmed at B. If they differ, the packet is rejected. This is very useful if a malfunctioning application holds onto a stale connection: it may transmit a packet which has a valid [host:in-index] address, but would have old nonce bits, and so would be rejected.

Remembering that the user level application has a control block for the out of band queue, this control block can also be used to allow control of the apertures associated with the application, in such a way that connection setup and tear down may be performed entirely at user level.

Note that some parts of the aperture control block only are user programmable, others must only be programmed by the operating system.

User Programmable bits include: nonce bits, destination host bits

O/System Programmable bits include:
  a) base address of incoming aperture (this prevents an application from corrupting memory buffers by mistake or malintent)
  b) source host bits (this prevents an application from masquerading as originating from another host).

For an untrusted application, kernel connection management would be performed. This means that out of band data would be processed only in the kernel, and no programmable bits would be made available to the application.

An example of an outgoing aperture table is shown in FIG. 10. Each row of the table represents an aperture and indicates the attributes of that aperture. It should be noted that:

1. A number of aperture sizes may be supported. These will be grouped such that the base address also gives the size of the aperture. Alternatively, a size field can be included in the aperture table.
2. The type field indicates the Ethernet type to use for the outgoing packet. It also indicates whether the destination address is a 4 byte IPv4 address or a 16 bit cluster address. (IPv6 addresses or other protocol addresses could equally be accommodated) The type field also distinguishes between event and data packets within the cluster. (An event packet will result in a fixed size event message appearing on the destinations event queue).
3. The PCI base address is OS programmable only, other fields may be programmed by the application at user level depending on the system's security policy.
4. Source Ethernet address, Source IP and Cluster address and possibly other information is common to all entries and stored in per NIC memory.
5. In all cases addressing of the outgoing Ethernet packet is either
  <Ethernet MAC><IP host: IP port> (in the case of a TCP/IP packet)
  or
  <Ethernet MAC><CI host: CI in-index: CI nonce: CI aperture offset> (in the case of a CI (computer interface) packet)
  (n.b. the offset is derived from the PCI address issued).
6. Each aperture is allocated an initial sequence number. This is incremented by the hardware as packets are processed and are optionally included in cluster address formats An example of an incoming aperture table is shown in FIG. 11. Each row of the table represents an aperture and indicates the attributes of that aperture. The incoming aperture is essentially the reverse of the outgoing aperture. It should be noted that:

1. As well as the size being optionally encoded by having fixed size tables, the EthType can be optionally encoded by grouping separate aperture tables
2. The sequence number fields are optional and the receiver can set
  (a) whether sequence checking should be done
  (b) the value of the initial sequence number
  If done this must also be communicated as part of the connection protocol, which could conveniently be performed in a similar way to the communication of nonce values from one host to another.
3. Similarly to outgoing apertures, some information is Per-NIC e.g. IP address, Ethernet address.
4. For application level robustness it is possible to "narrow" down an aperture by specifying an address and size which specifies a range which lies within the default range. This might be done when the application level data structure is of a size smaller, or different alignment, than the default aperture size and fine grained memory protection is required.
5. The map address is either the PCI address which the NIC should emit in order to write to memory for the aperture, or else a local (to the NIC's SRAM) pointer to the descriptor for the event queue.

Figure 12:
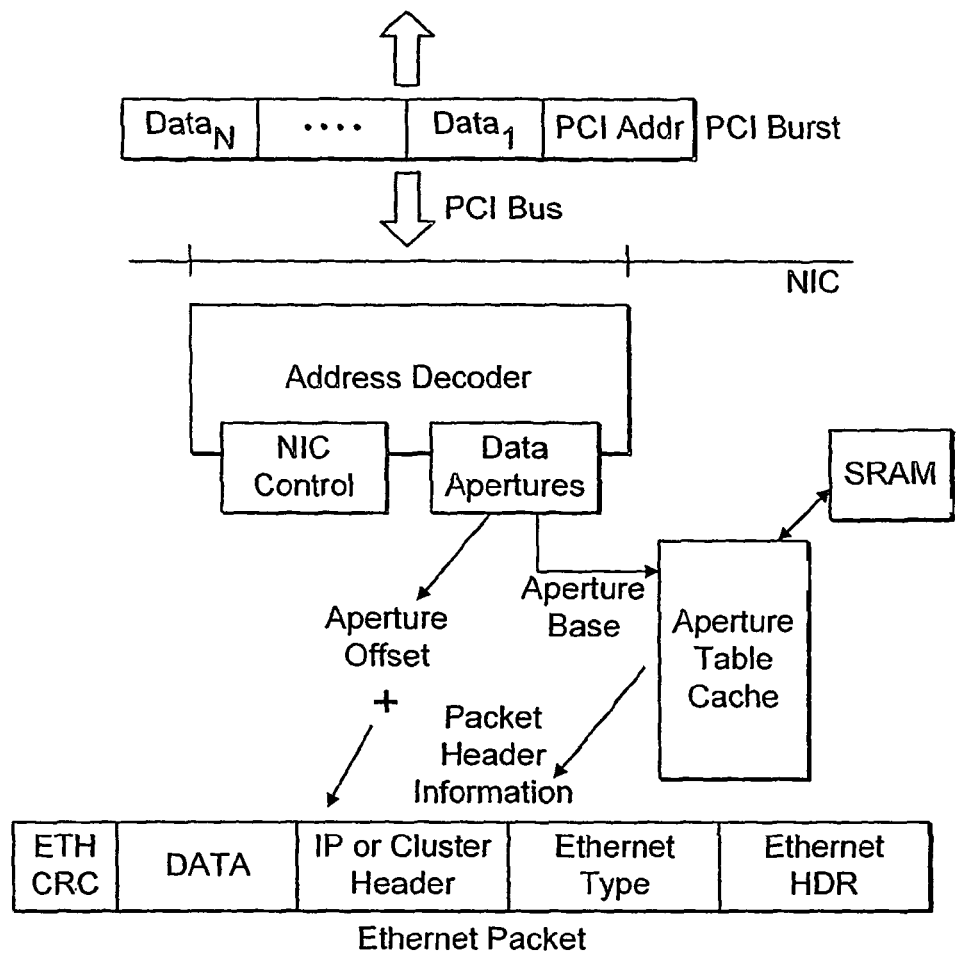
FIG. 12 shows the steps in a PCI write for an outgoing aperture.

A PCI write for an outgoing aperture is processed as shown in FIG. 12. The steps are as follows.

1. A PCI burst is emitted whose address falls within the range allocated to the NIC
2. The NIC's address decoder captures the burst and determines that the address is within the range of the apertures. (It could otherwise be a local control write).
3. Depending on the aperture size (which is coarsely determined from the address), the address is split into <base: offset>. E.g. for a 1 k aperture, the bottom 10 bits would be the offset. The base is fed into the aperture table cache to match the required packet header information.
4. Depending on the Ethernet packet type field either an IP/Ethernet or CI/Ethernet packet header is formed.
5. The CI packet would for instance, include the following fields:
   Data (containing the data payload of the PCI burst)
   Checksum (calculated by hardware over the contents of the header)
   Offset (by the address decoder)
   Sequence number
   Nonce
   Aperture index
   CI Host cluster address
6. If a number of PCI bursts arrive for a particular host, then they may be packed into a single Ethernet frame with compression techniques applied to remove redundant header information
7. In the present system a system-specific CRC or checksum is used to provide end-to-end protection and is appended to the data portion of the packet. Although the Ethernet packet also contains a CRC, it may be removed and recalculated on any hop (e.g. at a switch) and so does not provide protection against internal (e.g. switch-specific) corruptions.
8. If the sequence number is applied, then it is incremented and written back to the aperture table entry For incoming packets, the reverse operation takes place. The incoming aperture is looked up and checked to be:
 (a) valid;
 (b) sequence number expected matches that of the packet;
 (c) nonce matches (or port);
 (d) expected Ethernet source address;
 (e) expected IP or CI source addresses (which may be specified as a netmask
   to allow a range of source addresses to be matched);
Any one or more of these checks may be implemented or omitted, depending on the level of security required.

This lookup returns a field of: (base+extent) for the aperture. The offset is checked against the extent to ensure out of aperture access is not made and a PCI write is formed and emitted on the receiver's PCI bus with the format

| ... DATA$_2$ DATA$_1$ | base + offset |
|---|---|

If the PCI bus is stalled, (say on DATA$_N$) a new PCI transaction will be emitted.

| ... DATA$_{N+1}$ DATA$_N$ | base + offset + N |
|---|---|

Similarly if consecutive such data packets arrive they may be coalesced into larger PCI bursts simply by removing the redundant intermediate headers.

Protocol Scheme

One example of a protocol scheme that can be used in the above system will now be described.

In the present system, data is written into an aperture in bursts, each of which consists of an address offset value followed by one or more data words. An Ethernet frame can contain more than one burst. In the protocol described herein all the bursts in a single frame are applied to the same memory aperture.

Each burst contains a start address and then a sequence of 32-bit data words with byte-enables.

Figure 14:
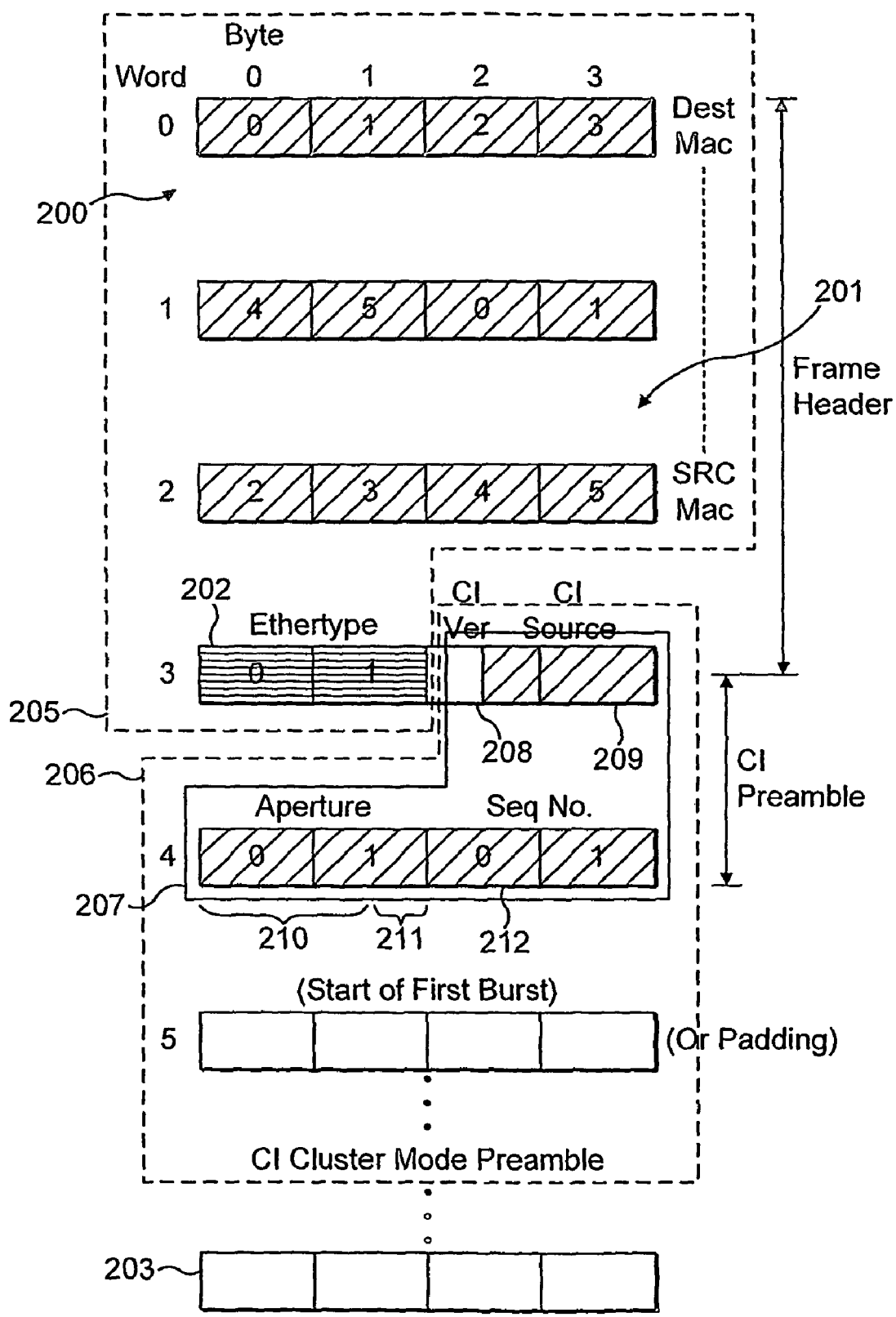
FIG. 14 shows the structure of an Ethernet packet.

FIG. 14 shows the structure of an Ethernet frame (which may also be termed a packet). The frame has a 14-byte header 205, comprising the destination MAC address 200, the source MAC address 201, and 16-bit type code or 'Ethertype' field 202 that defines the way that the frame payload is to be used. At the end of the frame is a checksum 203. The user data 206 carried in the frame is interpreted based on the type code contained in the header. To implement the present protocol for Ethernet packets a type code distinct from those indicative of other protocols would be used. Fields in the header are filled according to network byte order (i.e. big-endian), for consistency with other networking protocols.

Ethernet specifies a minimum packet length of 64 bytes. In the present protocol packets shorter than this are padded to the required length with bytes containing all-zeros. (Typically such padding is automatically added by Ethernet MAC chips.) The present protocol allows all-zero padding at the end of any packet. Bursts within a packet can also be padded with zeros. Other data forms, such as escape words, could alternatively be used as padding.

The user data section 206 of a packet according to the present protocol comprises a 6-byte preamble 207 followed by one or more bursts. The preamble 207 is made up as follows:

Protocol Version number (208) (4 bits)
Source Number (209) (12 bits)—this indicates the identity of the source of the subsequent data
Aperture Number (210) (12 bits)—this identifies the aperture in the destination unit to which the subsequent data is addressed.
Nonce (211) (4 bits)
Sequence Number (212) (16 bits)—separate sequence for each aperture.

The fields could be changed in size, and this could be indicated by the allocation of a different version number to each defined format of the fields.

Figure 15:
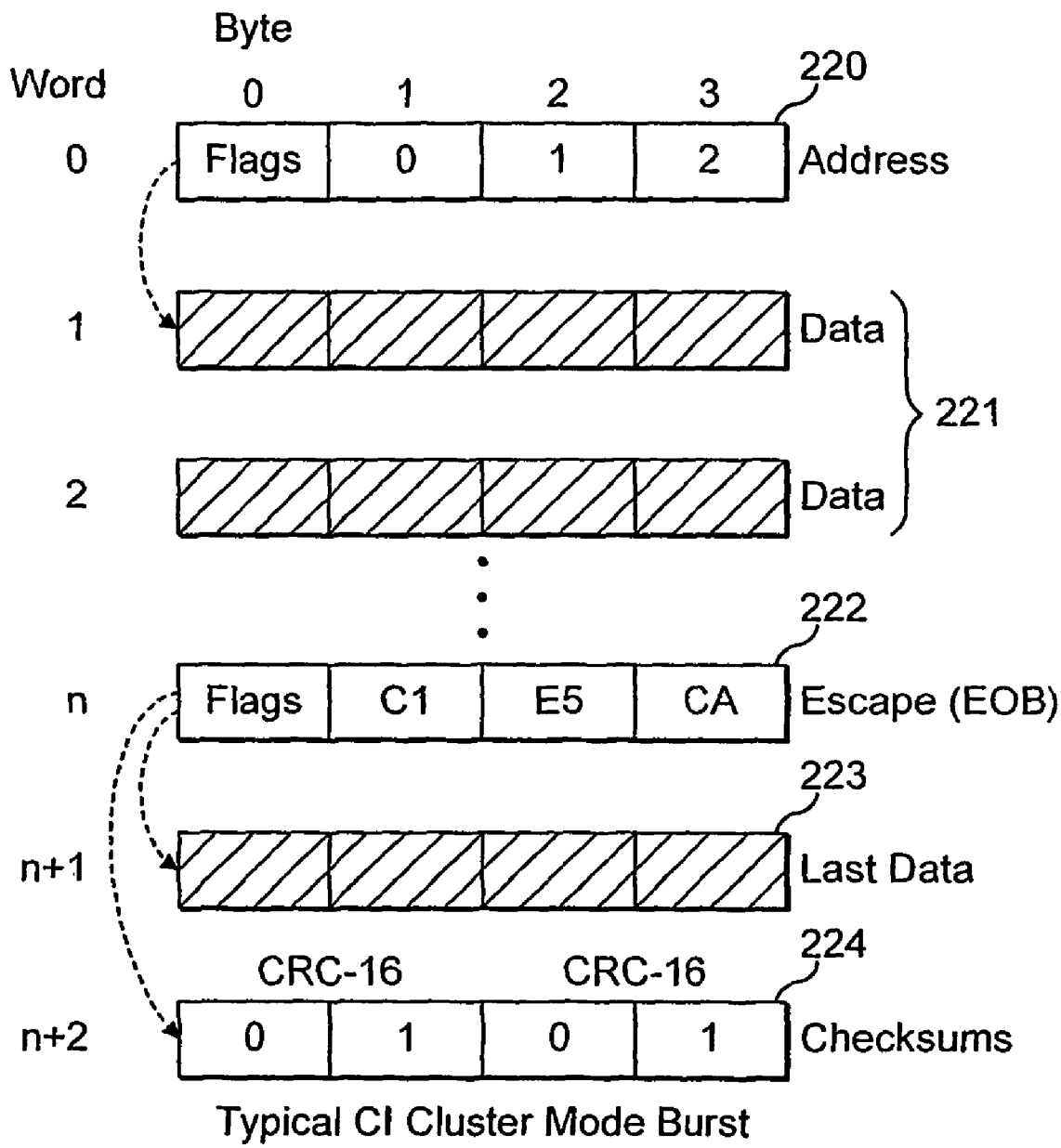
FIG. 15 illustrates the structure of a burst in frame.

FIG. 15 illustrates the structure of a burst in frame. The burst is made up as follows:

Address word: (220) (32 bits) (including 8 flag bits, one of which is set to indicate the start of the burst (SOB))
Data words (221) (can include embedded Escape Words and Checksum Words if required)—these contain the actual user data to be conveyed
Escape word (222) with EOB set (see below)
Last data word (223)
Checkword (224)—made up of two 16-bit CRCs both calculated over the burst Bursts are not of fixed length. To allow the receiver to identify the end of a burst, the end of each burst is flagged by the use of an escape word. The escape word is identified by having its bytes 1 to 3 equal to a defined constant value, in this example hex C1E5CA. Byte 0 of the escape word contains flag bits, which apply to the next 32-bit data word. The flag bits are defined as follows:

bit 0—BV0—byte 0 of the next word is valid
bit 1—BV1—byte 1 of the next word is valid
bit 2—BV2—byte 2 of the next word is valid
bit 3—BV3—byte 3 of the next word is valid
bit 4—SOB—the next word is Start-Of-Burst
bit 5—EOB—the next word is End-Of-Burst
bit 6—CKS—the next-but-one word is a checkword
bit 7—reserved, set to zero It is possible that a word may appear in the user data that has its bytes 1 to 3 equal to the defined constant value. To indicate that such a word is valid, the unit that generates the frame must insert an escape word before such a word. Bits 0 to 3 of that escape word are set to indicate that the subsequent word is valid.

An escape word may also be inserted into a burst to indicate that the following data word contains one or more invalid bytes. To achieve this the appropriate ones of bits 0 to 3 of that escape word are not set, so as to indicate that corresponding bytes of the subsequent word are invalid.

Escape words followed by "checkpoint" checkwords (see below) may be inserted into a burst to reduce the amount of data that has to be buffered at a receiving NIC before it can be safely shipped to memory. This will be described in more detail below.

Figure 16:
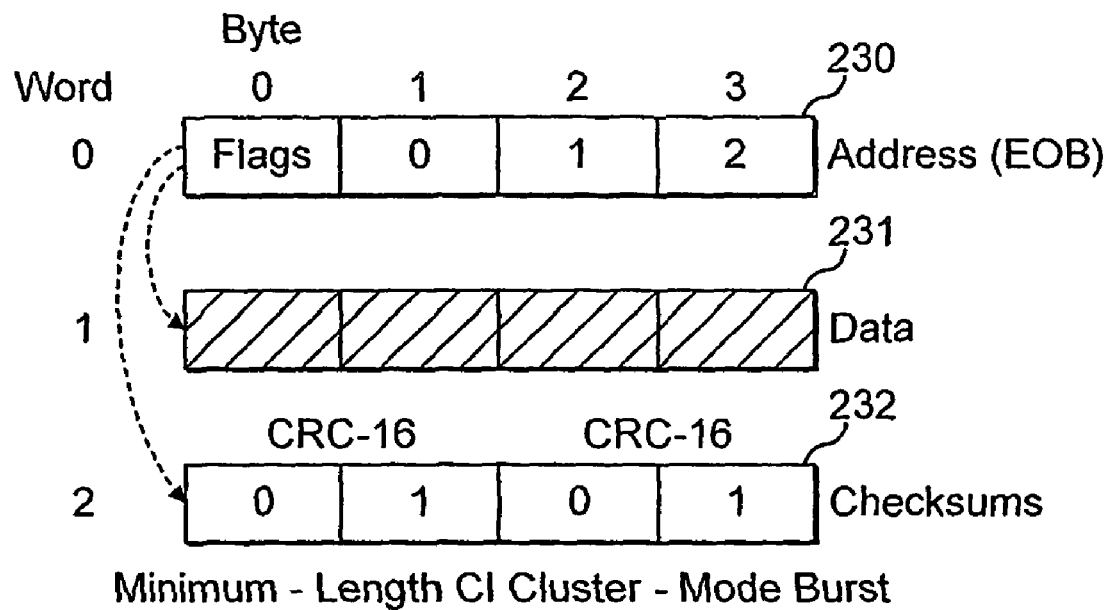
FIG. 16 shows a data burst.

Bursts according to the present protocol do not contain any explicit length count field. The end of the burst is indicated by an escape word. If EOB is flagged then CKS must also be flagged. The checksum word at the end of each burst is mandatory. Thus the shortest possible burst is as illustrated in FIG. 16. This comprises three words: an escape word 230 with EOB and CKS set, a single data word 231 and a checksum word 232. In this example, the escape word takes the place of the address word.

Each burst begins with an address word which in normal usage indicates the offset into the memory aperture of the receiver at which the data in the burst is to be written. The address value field occupies bytes 1 to 3 of the address word (24 bits). Byte 0 of the address word contains flag bits having the same format and meaning as those of the escape word. These flag bits apply to the first data word of the burst. The SOB flag bit is set in the first word of a burst, guaranteeing that the beginning of a burst can be distinguished from padding words, which have all 32 bits set to zero.

Each burst ends with a checkword. Checkwords may also be added at intervals within a burst. In the present protocol the checkword comprises two 16-bit CRC fields, together forming 32 bits of check data. The methods by which the two CRCs are calculated are selected so that the use of two blocks of check data provides additional error detection capability over either of the 16-bit blocks of check data individually, but without requiring such intensive processing as would be needed to calculate a single 32-bit block of check data by similar algorithms. Other schemes such as a 32-bit CRC could also be used (with a different version of the protocol).

Both of the 16-bit CRCs are formed by cyclic redundancy check (CRC) algorithms. Both of the fields are computed over the same data, beginning with the ethertype field of the Ethernet frame header and working progressively through the packet. For the purposes of computing the CRC fields, the checkwords themselves are assumed to contain the value all-zero.

The methods for forming the CRCs are as follows:
1. The first CRC field uses the coefficients (the generator polynomial) which are the standard set known as 'X25'. The CRC value is seeded with the 16-bit value 'all-one' at the beginning of each packet. This CRC occupies bytes 0 and 1 of the checkword.
2. The second CRC field uses the coefficients which are the standard set known as 'USB CRC-16'. As with the other CRC field, the CRC value is seeded with the 16-bit value 'all-one' at the beginning of each packet. This CRC occupies bytes 2 and 3 of the checkword.

Other methods could be used to generate one or both of the CRCs, and either or both of the CRCs could be replaced by check data of a form other than a CRC.

This method of forming the checkwords has a number of advantages. First, Ethernet frames are protected in transit by a 32-bit CRC (the Ethernet frame checksum or FCS), which is typically generated and checked by the MAC chips that drive each link. However, there are forms of data corruption that the FCS cannot protect against. Switches can strip and recalculate the FCS; if this happens then the packet payload is not protected inside the switch itself. Switches (and routers) can mangle packets in ways which (often caused by program failures) are quite different to the errors (of a statistical nature) that would be introduced by electrical interference on a link. Also, routers are bound to recalculate the FCS if they change a packet's IP header, for example by reducing the hop count. Second, by not relying on the Ethernet FCS the present protocol opens up the possibility of cutting latency by using a MAC device which does not buffer a complete Ethernet packet on receive: for example by using cut-through forwarding techniques as described in our co-pending patent application entitled "Managing Data Transmission". Third, it adopts a valuable compromise between the relatively intensive processing that would be needed to generate a 32-bit checksum, and the lower guarantee of data integrity that would be given by a 16-bit checksum.

It is possible that an escape word could be corrupted during transmission, causing it to be treated as a data word at the receiver. This could create result in a 'runaway packet', which could possibly have the effect of the destination memory being over-written with junk data. To prevent this, the data from a received burst is not written to memory until a valid checksum word covering that data has been successfully received. In longer bursts, the latency and amount of buffering that is needed can be kept in check by including "checkpoint" checkwords at pre-set intervals. Checkpoint checkwords are formed in the same way as final checkwords, computing the CRCs for the checkpoint checkwords over the all the data in the packet beginning with the ethertype field of the Ethernet frame header and working progressively through the packet up to the word of the checkpoint checkword itself. For the purposes of computing the CRC fields, the checkpoint checkword that is being computed is assumed to contain the value all-zero.

At the receiver the checkwords are verified by using the same algorithms as at the transmitter on the received data. If the verification is successful (i.e. if the CRCs calculated at the receiver match those received in the checkwords) then the data is processed appropriately at the receiver. If the verification is unsuccessful then steps may be taken to have the data retransmitted.

Where packets contain more than one checkword, it is possible that a single packet may include both good data (i.e. data for which the CRCs agree at the receiver) and bad data (i.e. data for which the CRCs do not agree at the receiver). Data may also be determined to be bad at the receiver if the information in the packet header is not internally consistent, or does not agree with the current state of the receiver, for instance if:

The ethertype of the packet is not that which is expected by the receiver

The 4-bit version number of the packet is invalid

The aperture number specified in the packet is undefined at the receiver

The source number does not match the one that is recorded at the receiver as being valid for the specified aperture The sequence number is not credible according to a checking algorithm implemented by the receiver. For instance the algorithm may treat packets whose sequence number precedes a previously received packed as being invalid, and/or that are received out of sequence (including the case of repeated packets) as being invalid.

The Ethernet source address and/or the destination MAC address are not as expected by the receiver.

For additional protection, the sequence number could be incremented by a non-obvious algorithm, or encrypted. This would make it very difficult to perform "man in the middle" attacks.

Some classes of error are dealt with by passing the packet to a kernel software stack. Others cause the packet to be discarded and an event token issued from the receiver of the packet to the transmitter to signal that the error has occurred. In response to the error token the transmitter can take action to rectify the error, for example by re-sending the erroneous packet to the receiver.

Errors that indicate that the traffic on an aperture is damaged—for instance in the case of a dropped or repeated sequence number—cause reception on the relevant aperture to be stopped and an event token to be issued to the transmitter.

Event tokens can be generated by a transmitting NIC and sent to the receiver to indicate an event. At the receiver the event token is enqueued for the attention of the process that 'owns' the aperture to which the event token applies. Queues of event tokens are referred to as "event queues". Each event token consists of one 32-bit word made up as follows:

bits 31-16—bits 15-0 of the aperture number to which the event token applies bits 15-8—reserved bits 7-4—bits 3-0 of a pointer index in the specified aperture number bits 3-0—bits 3-0 of an indicator of the type of the event The following types of event can be defined:

| Event Type | Aperture Number | Pointer Index |
|---|---|---|
| Pointer Update | Yes | yes |
| Out-Of-Sequence Packet | Yes | — |
| Bad Aperture Number | Yes | — |
| CI Checksum error | Yes | — |
| CI Protocol failure | Yes | — |

| Event Type | Aperture Number | Pointer Index |
|---|---|---|
| Truncated CI burst | Yes | — |
| Failed Packet | — | — |
| Bad source MAC address | — | — |
| Bad destination MAC address | — | — |

The pointer index field of the event token is only valid if the event token is of type pointer update. In this case it identifies which of a pre-defined set of pointer locations was written to. A typical implementation might be to define four pointer locations at byte offsets 0, 64, 128 and 192 from the base of each aperture, representing them with pointer index values of 0, 1, 2 and 3.

Where an event token reports an error that cannot be resolved to a valid aperture, the aperture number field is not used and the token is sent to a central logging queue at the receiver.

As explained above, at the beginning of a burst is an indication of the memory address at the receiver at which the data in a burst is to be written. The data is intended to be written to that and subsequent addresses. There will be a checksum at the end of the burst, and once that checksum has been verified the data may safely be written. If that were the only checksum in the burst then in order to ensure safe operation the whole burst would have to be buffered until that checksum had been verified, otherwise the address might have been received incorrectly and if the data were to have been written at the incorrect address it would have overwritten the data already there. However, if there is an intermediate checksum in the burst that can reduce the amount of buffering that is needed. Once a checksum covering the address has been verified it is known to an acceptable level of confidence that the address has been received correctly none of the data in the burst needs to be buffered: it can be written straight to the appropriate place in the memory. If a subsequent checksum indicates that the data has been received incorrectly then the data already stored to memory can be marked as invalid, and the data can be re-sent.

One method for performing this will now be described in more detail with reference to FIG. 17.

Figure 17:
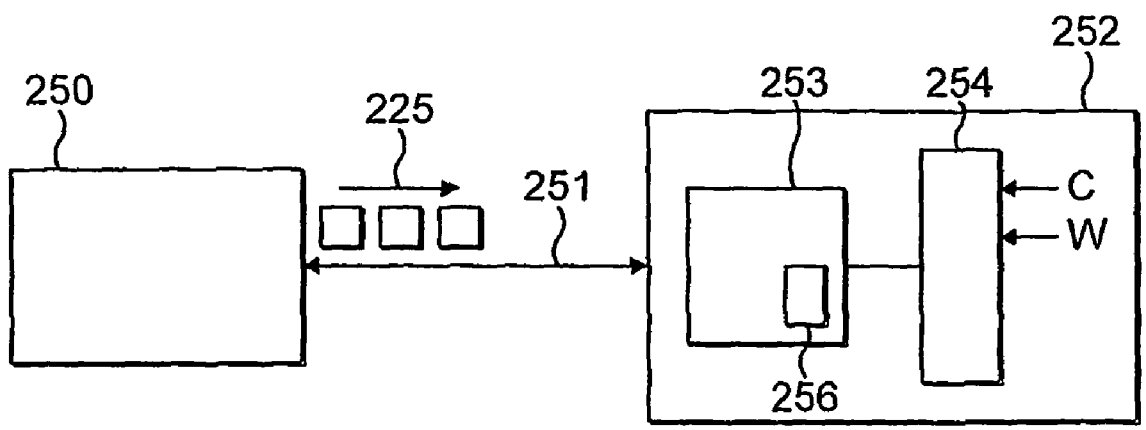
FIG. 17 illustrates data reception into memory.

FIG. 17 illustrates the flow of packets 255 from a transmitter 250 over a data link 251 to a receiver 252. At the receiver the packets are interpreted by an interface device 253 and received data can be written to a memory 254. The memory 254 may in practice be an aperture. Each packet is formed as described above and includes one or more bursts each including a field specifying the address in memory 254 at which the data of the burst is to be written, the data of the burst itself, and a terminating checksum. A burst may also include one or more intermediate checksums between the address specifier and the terminating checksum.

When a burst is received the specified address (A) is determined. The received data to be written at that address is then buffered in a local buffer 256 in the interface device 253 until a checksum in the packet is reached. If the checksum is verified by the interface device the address is assumed to have been correctly received, and so the network device sets a write pointer W operating on memory 254 to the specified address A. The data is written to the write pointer, and the write pointer is incremented as the data is written so that it points to the location in the memory at which the next received data is to be written. The interface device also maintains a checked pointer C operating on memory 254. The checked pointer is initially set to address A. When a checksum in the packet is reached and verified the checked pointer C is updated to the current position of the write pointer W. If the checksum is not verified the checked pointer C is not altered.

As described above, an application running at the receiver is associated with memory 254. When the interface device verifies a checksum it transmits a "P" message to the application associated with the memory to which the data covered by the checksum was written. The P message indicates that data has been successfully written and specifies the addresses between which the successfully written data lies (i.e. the value of the C pointer before and after verification). The P message indicates to the application that that data is now ready for use. If a checksum is not verified then the interface device transmits a "B" message to the application. The B message indicates that data has not been successfully written and specifies the addresses between which the incorrectly written data lies (i.e. the value of the C pointer and the value of the W pointer). The application can then cause the interface device 253 to request the transmitter 250 to retransmit the data intended to be written between those pointer values.

When bursts contain intermediate checksums this method allows the amount of data that has to be buffered before writing to be reduced. It also allows cut-through forwarding to be used on the final hop of data link 251 to receiver 252 without the need to buffer the whole packet in order to perform error correction.

Some applications do not require this level of error recovery and operate correctly so long as the NIC does not deliver any corrupt data, and informs the application of either data corruptions or lost data. In the absence of other information, the application must perform retransmission through negotiation with its communicating peer application.

Also, for other applications, the pointer updates are transmitted over the network as part of the data stream. The error recovery described above can take place so long as the pointer updates are all logged via the event queue.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of transmitting data according to a data transmission protocol as a plurality of data frames, each data frame including a frame header and an error checking field comprising at least two sub-fields, the method comprising for each data frame:
   forming data for a first sub-field of the error checking field by a first error checking method performed on particular data of the frame;
   forming data for a second sub-field of the error checking field by a second error checking method performed on the particular data of the frame; and
   transmitting the data frame;
   wherein the first and second error checking methods are such that the data of the first sub-field has different error checking properties from those of the data of the second sub-field, and the frame header is excluded from the data of the frame on which the first and second error checking methods are performed.

2. A method as claimed in claim 1, wherein the error checking field is a data word in the data frame.

3. A method as claimed in claim 2, wherein the error checking field consists of data bits that are contiguous in the frame.

4. A method as claimed in claim 1, wherein the first sub-field consists of bits that are contiguous in the frame.

5. A method as claimed in claim 1, wherein each of the first and second sub-fields consists of bits that are contiguous in the frame.

6. A method as claimed in claim 1, wherein the first sub-field and the second sub-field are of equal length.

7. A method as claimed in claim 1, wherein the first and second error checking methods are cyclic redundancy check methods using respective first and second generator polynomials, and the generator polynomial for the first error checking method is different from the generator polynomial for the second error checking method.

8. A method as claimed in claim 7, wherein one of the generator polynomials is the X25 polynomial.

9. A method as claimed in claim 7, wherein one of the generator polynomials is the USB CRC-16 polynomial.

10. A method as claimed in claim 1, wherein the first and second error checking methods are such that they result in the data of the first sub-field having different statistical properties from the data of the second sub-field as regards its indication of errors in data.

11. A method as claimed in claim 1, wherein the protocol is such that each data frame comprises at least one data section, each data section comprising an address and traffic data to be applied to that address by a recipient of the data frame.

12. A method as claimed in claim 1, wherein the frame header indicates a member of the group consisting of a source address of the data frame, a destination address of the data frame and a hop count for the data frame.

13. A method as claimed in claim 1, wherein the data frame is an Ethernet frame.

14. A method as claimed in claim 1, wherein the protocol is such that the data frame comprises a frame checksum calculated over the frame.

15. A method as claimed in claim 14, wherein the frame header is included in the data on which the frame checksum is calculated.

16. A method as claimed in claim 1, comprising:
  at a data transmitter forming a data frame according to the data transmission protocol;
  transmitting the data frame over a data network from the data transmitter to a data receiver; and
  at the data receiver verifying the received data on the basis of the data of the first and second sub-fields of the error checking field.

17. A data transceiver, for use in transmitting data according to a data transmission protocol as a plurality of data frames, each data frame in the plurality including a frame header and an error checking field comprising at least two sub-fields, comprising:
  means for forming data for a first sub-field of the error checking field in each given frame in the plurality, by a first error checking method performed on particular data of the given frame;
  means for forming data for a second sub-field of the error checking field in each particular frame in the plurality, by a second error checking method performed on the particular data of the particular frame; and
  transmitting the data frames in the plurality,
  wherein the first and second error checking methods are such that the data of the first sub-field of each subject frame in the plurality has different error checking properties from those of the data of the second sub-field of the subject frame, and the frame header of the subject frame is excluded from the data of the frame on which the first and second error checking methods are performed.

* * * * *